(12) United States Patent
Wohl, Jr. et al.

(10) Patent No.: US 9,278,374 B2
(45) Date of Patent: Mar. 8, 2016

(54) MODIFIED SURFACE HAVING LOW ADHESION PROPERTIES TO MITIGATE INSECT RESIDUE ADHESION

(71) Applicant: The United States of America as represented by the Administrator of the National Aeronautics and Space Administration, Washington, DC (US)

(72) Inventors: Christopher J. Wohl, Jr., Portsmouth, VA (US); Joseph G. Smith, Jr., Smithfield, VA (US); Emilie J. Siochi, Newport News, VA (US); Ronald K. Penner, Hampton, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 30 days.

(21) Appl. No.: 13/913,782

(22) Filed: Jun. 10, 2013

(65) Prior Publication Data

US 2015/0251217 A1 Sep. 10, 2015

Related U.S. Application Data

(60) Provisional application No. 61/657,322, filed on Jun. 8, 2012, provisional application No. 61/788,785, filed on Mar. 15, 2013.

(51) Int. Cl.
*B05D 5/00* (2006.01)
*B05D 3/06* (2006.01)

(52) U.S. Cl.
CPC .. *B05D 5/00* (2013.01); *B05D 3/06* (2013.01); *Y10T 428/24364* (2015.01)

(58) Field of Classification Search
CPC .................................................. B23K 26/4085
See application file for complete search history.

(56) References Cited

U.S. PATENT DOCUMENTS

| 3,814,895 A | 6/1974 | Fredriksen |
| 4,085,137 A | 4/1978 | Mitsch et al. |

(Continued)

FOREIGN PATENT DOCUMENTS

| DE | 20114878 | 3/2002 |
| GB | WO00/14297 | 3/2000 |

(Continued)

OTHER PUBLICATIONS

Ronald D. Joslin, "Aircraft Laminar Flow Control," Annu. Rev. Fluid Mech., 1998, pp. 1-29, vol. 30.
TM Young et al., "Liquid Anti-contamination Systems for Hybrid Laminar Flow Control Aircraft—A Review of the Critical Issues and Important Experimental Results," Proceedings of the Institution of Mechanical Engineers, J. Aerospace Engineering, 2004, pp. 267-277, vol. 218, Part G.

(Continued)

*Primary Examiner* — Nathan T Leong
(74) *Attorney, Agent, or Firm* — Andrea Z. Warmbier; Robins W. Edwards (57) ABSTRACT

A process to modify a surface to provide reduced adhesion surface properties to mitigate insect residue adhesion. The surface may include the surface of an article including an aircraft, an automobile, a marine vessel, all-terrain vehicle, wind turbine, helmet, etc. The process includes topographically and chemically modifying the surface by applying a coating comprising a particulate matter, or by applying a coating and also topographically modifying the surface by various methods, including but not limited to, lithographic patterning, laser ablation and chemical etching, physical vapor phase deposition, chemical vapor phase deposition, crystal growth, electrochemical deposition, spin casting, and film casting.

19 Claims, 4 Drawing Sheets

(56) References Cited

U.S. PATENT DOCUMENTS

| | | | |
|---|---|---|---|
| 4,543,464 A | 9/1985 | Takeuchi | |
| 4,760,112 A | 7/1988 | McCready et al. | |
| 4,898,650 A | 2/1990 | Wu et al. | |
| 4,908,409 A | 3/1990 | Oikawa et al. | |
| 4,908,494 A | 3/1990 | Faiz et al. | |
| 5,252,168 A | 10/1993 | Johnston et al. | |
| 5,308,737 A | 5/1994 | Bills et al. | |
| 5,313,000 A | 5/1994 | Stewart | |
| 5,373,140 A | 12/1994 | Nagy et al. | |
| 5,435,876 A | 7/1995 | Alfaro et al. | |
| 5,468,841 A | 11/1995 | Malik et al. | |
| 5,500,505 A | 3/1996 | Jones | |
| 5,635,089 A | 6/1997 | Singh et al. | |
| 5,637,772 A | 6/1997 | Malik et al. | |
| 5,688,564 A | 11/1997 | Coddet et al. | |
| 5,841,100 A | 11/1998 | Minhas | |
| 6,056,827 A | 5/2000 | Fukui et al. | |
| 6,426,150 B1* | 7/2002 | Jenkner et al. | 428/447 |
| 6,686,051 B1 | 2/2004 | Weinert et al. | |
| 6,698,354 B2 | 3/2004 | Juffinger et al. | |
| 6,855,775 B2 | 2/2005 | Medsker et al. | |
| 6,872,266 B1 | 3/2005 | Ciaramitaro | |
| 6,972,317 B2 | 12/2005 | Weinert et al. | |
| 6,976,585 B2 | 12/2005 | Extrand | |
| 7,022,801 B2 | 4/2006 | Medsker | |
| 7,258,731 B2* | 8/2007 | D'Urso | B05D 5/083 106/2 |
| 7,320,829 B2 | 1/2008 | Wright et al. | |
| 7,396,590 B2 | 7/2008 | Wynne | |
| 7,419,615 B2 | 9/2008 | Strauss | |
| 7,498,375 B2 | 3/2009 | Harashina et al. | |
| 7,771,793 B2 | 8/2010 | Wynne et al. | |
| 7,928,153 B2 | 4/2011 | Dershem | |
| 2001/0011545 A1 | 8/2001 | Thompson et al. | |
| 2002/0134770 A1 | 9/2002 | Freiwald et al. | |
| 2002/0149136 A1 | 10/2002 | Baird et al. | |
| 2002/0170892 A1 | 11/2002 | Lee et al. | |
| 2002/0190435 A1 | 12/2002 | O'Brien et al. | |
| 2003/0092862 A1 | 5/2003 | Thomas et al. | |
| 2003/0208015 A1 | 11/2003 | Medsker et al. | |
| 2004/0087759 A1 | 5/2004 | Malik et al. | |
| 2004/0124184 A1 | 7/2004 | An et al. | |
| 2004/0137699 A1 | 7/2004 | Kurosawa | |
| 2004/0206731 A1 | 10/2004 | Song et al. | |
| 2004/0224164 A1 | 11/2004 | Wright et al. | |
| 2005/0048213 A1 | 3/2005 | Callicott et al. | |
| 2005/0236107 A1 | 10/2005 | Doi et al. | |
| 2006/0079062 A1 | 4/2006 | Mazur et al. | |
| 2006/0088716 A1 | 4/2006 | Wynne | |
| 2006/0108330 A1 | 5/2006 | Lee et al. | |
| 2006/0147634 A1 | 7/2006 | Strauss | |
| 2006/0194065 A1 | 8/2006 | Wynne et al. | |
| 2007/0141306 A1 | 6/2007 | Kasai et al. | |
| 2007/0166464 A1 | 7/2007 | Acatay et al. | |
| 2007/0193985 A1 | 8/2007 | Howard et al. | |
| 2007/0224391 A1 | 9/2007 | Krupenkin et al. | |
| 2007/0272555 A1 | 11/2007 | Baird | |
| 2008/0121845 A1 | 5/2008 | Mills et al. | |
| 2008/0138582 A1 | 6/2008 | Bhandari et al. | |
| 2008/0160295 A1 | 7/2008 | Lappalainen et al. | |
| 2008/0199657 A1 | 8/2008 | Capron et al. | |
| 2008/0216300 A1 | 9/2008 | Anderson et al. | |
| 2008/0217180 A1 | 9/2008 | Doye et al. | |
| 2009/0008372 A1 | 1/2009 | Lee et al. | |
| 2009/0011222 A1* | 1/2009 | Xiu et al. | 428/323 |
| 2009/0020137 A1 | 1/2009 | Osawa | |
| 2009/0038637 A1 | 2/2009 | LeClaire et al. | |
| 2009/0191693 A1 | 7/2009 | Iizuka | |
| 2009/0227089 A1 | 9/2009 | Plaut et al. | |
| 2010/0001437 A1 | 1/2010 | Lawton et al. | |
| 2010/0028604 A1 | 2/2010 | Bhushan et al. | |
| 2010/0040833 A1 | 2/2010 | Quartarone | |
| 2010/0279012 A1 | 11/2010 | Sato | |
| 2010/0316845 A1 | 12/2010 | Rule et al. | |
| 2011/0086204 A1* | 4/2011 | Wohl et al. | 428/156 |
| 2011/0287217 A1 | 11/2011 | Mazumder et al. | |
| 2013/0052409 A1* | 2/2013 | Balcome et al. | 428/131 |
| 2013/0120498 A1* | 5/2013 | Grabowski et al. | 347/45 |

FOREIGN PATENT DOCUMENTS

| | | |
|---|---|---|
| KR | 1020090012567 | 2/2009 |
| WO | WO99/37830 | 7/1999 |

OTHER PUBLICATIONS

Manickam Sugumaran, "Comparative Biochemistry of Eumelanogenesis and the Protective Roles of Phenoloxidase and Melanin in Insects," Pigment Cell Res, 2002, pp. 2-9, vol. 15.

C.A. Mandato et al., "Insect Hemacyte Adhesion In Vitro: Inhibition by Apoliphorin I and an Artificial Substrate," J. Insect Physiol., 1996, pp. 143-148, vol. 42, No. 2.

G.V. Lachmann, "Boundary Layer and Flow Control Its Principles and Application," 1961, pp. 682-747, vol. 2, Pergamon Press, New York.

G. V. Lachmann, "Aspects of Insect Contamination in Relation to Laminar Flow Aircraft," Ministry of Aviation Aeronautical Research Council, A.R.C. Technical Report, 1960, pp. 1-25, C.P. No. 484, London, U.K.

Dal V. Maddalon et al., "Simulated Airline Service Experience With Laminar-Flow Control Leading-Edge Systems," NASA Conference Publication 2847 Part I, Research in Natural Laminar Flow and Laminar-Flow Control, Mar. 16-19, 1987, pp. 195-218, Hampton, Virginia.

John B. Peterson, Jr. et al., "Flight Investigation of Insect Contamination and Its Alleviation," NASA Conference Publication 2036 Part 1, CTOL Transportation Technology, Feb. 28-Mar. 3, 1978, pp. 357-373, Hampton, Virginia.

David F. Fisher et al., "Flight Experience on the Need and Use of Inflight Leading Edge Washing for a Laminar Flow Airfoil," AIAA Aircraft Systems and Technology Meeting, Aug. 21-23, 1978, pp. 1-10, Los Angeles, California.

T. L. B. Tamigniaux et al., "An Experimental Investigation of the Insect Shielding Effectiveness of a Krueger Flap/Wing Airfoil Configuration," AIAA 87-2615, 1987, pp. 601-606.

Arthur G. Powell, "The Right Wing of the L.E.F.T. Airplane," NASA Conference Publication 2487 Part 1, Research in Natural Laminar Flow and Laminar-Flow Control, Mar. 16-19, 1987, pp. 141-161, Hampton, Virginia.

R.D. Wagner et al., "Developments in the NASA Transport Aircraft Laminar Flow Program," AIAA 21st Aerospace Sciences Meeting, Jan. 10-13, 1983, pp. 1-11, Reno, Nevada.

W. E. Pearce, "Evaluation of Laminar Flow Control Systems Concepts for Subsonic Commercial Transport Aircraft," NASA Contractor Report 159252, Dec. 1982, pp. 1-63, Long Beach, CA.

F. S. Collier, Jr., "An Overview of Recent Subsonic Laminar Flow Control Flight Experiments," AIAA 24th Fluid Dynamics Conference, Jul. 6-9, 1993, pp. 1-24, Orlando, Florida.

F. Smith et al., "Flight Tests on "King Cobra" FZ.440 to Investigate the Practical Requirements for the Achievement of Low Profile Drag Coefficients on a "Low Drag" Aerofoil," Ministry of Supply Aeronautical Research Council Reports and Memoranda, 1950, pp. 1-20, A.R.C. Technical Report R. & M. No. 2375 (9043), London, U.K.

W.E. Gray et al., "Note on the Maintenance of Laminar Flow Wings," Ministry of Supply Aeronautical Research Council Reports and Memoranda, 1952, pp. 1-3, A.R.C. Technical Report, R & M No. 2485, (10,518) London, U.K.

F.X. Wortmann, "A Method for Avoiding Insect Roughness on Aircraft," NASA Technical Translation F-15,454, Apr. 1974, Translation of "Eine Möglichkeit zur Vermeidung der Insektenrauhigkeit an Flugzeugen," Luftahrttechnik, Raumfahrttechnik, Sep. 1963, pp. 272-274, vol. 9, No. 9.

E. J. Siochi, et al., "A Fundamental Study of the Sticking of Insect Residues to Aircraft Wings," Journal of Colloid Interface Science, Feb. 1987, pp. 346-356, vol. 115, No. 2.

Cynthia C. Croom et al., "Insect Contamination Protection for Laminar Flow Surfaces," Langley Symposium on Aerodynamics, NASA Conference Publication 2397, Apr. 23-25, 1986, pp. 539-556, vol. 1, Hampton, Virginia.

(56) References Cited

OTHER PUBLICATIONS

C.C. Croom et al., "Flight Evaluation of an Insect Contamination Protection System for Laminar Flow Wings," 1985 SAE General Aviation Meeting and Exposition, Apr. 16-19, 1985, pp. 1-9, Wichita, Kansas.

D. O'Donoghue et al., "An Investigation of Surfactant and Enzyme Formulations for the Alleviation of Insect Contamination on Hybrid Laminar Flow Control (HLFC) Surfaces," Aerospace Science and Technology, 2002, pp. 19-29. vol. 6.

C. Van Oss et al., "Reevaluation of the Surface Tension Components and Parameters of Polyacetylene from Contact Angles of Liquids," American Chemical Society, 1990, pp. 1711-1713, vol. 6.

Yasuaki Kitzaki et al., "Surface-Chemical Criteria for Optimum Adhesion," Journal of Adhesion, 1972, pp. 123-132, vol. 4, Gordon and Breach Science Publishers Ltd, Northern Ireland.

Hata, Toshio, et al., "Estimation of the Surface Energy of Polymer Solids," J. Adhesion, 1987, pp. 177-194, vol. 21, Gordon and Breach Science Publisher, Inc., United Kingdom.

J. Vial et al., "Calculation of Hamaker Constant and Surface Energy of Polymers by a Simple Group Contrioution Method," Int. J. Adhesion and Adhesives, Jul. 1991, pp. 140-143, vol. 11, No. 3.

Takashi Nishino et al., "The Lowest Surface Free Energy Based on—CF3 Alignment," Langmuir, 1999, pp. 4321-4323, vol. 15.

S. R. Coulson et al., "Ultralow Surface Energy Plasma Polymer Films," Chem. Mater, 2000, pp. 2031-2038, vol. 12, No. 7, American Chemical Society.

Eun H. Cirlin et al., "Roughness and Anisotropy Effects on Wettability of Polytetrafluoroethylene and Sodium-treated Polytetrafluoroethylene," Journal of Polymer Science: Polymer Physics Edition, 1973, pp. 785-799, vol. 11.

Fritz-Olaf Lehman et al., "The Production of Elevated Flight Force Compromises Manoeuvrability in the Fruit Fly *Drosophila melanogaster*," The Journal of Experimental Biology, 2001, pp. 627-635, vol. 204.

D. Sumner et al., "On Uniform Planar Shear Flow Around a Circular Cylinder at Subcritical Reynolds Number," Journal of Fluids and Structures, 2003, pp. 441-454, vol. 18.

G. Ziskind et al., "Adhesion Moment Model for Estimating Particle Detachment from a Surface," J. Aerosol Sci., 1997, pp. 623-634, vol. 28, No. 4.

Ronald D. Joslin, "Overview of Laminar Flow Control," NASA/TP-1998-208705, Oct. 1998, pp. 1-129.

B. J. Holmes et al., "Observations and Implications of Natural Laminar Flow on Practical Airplane Surfaces," Journal of Aircraft, Dec. 1983, pp. 993-1006, vol. 20, No. 12.

Clifford J. Obara, "Sublimating Chemical Technique for Boundary-Layer Flow Visualization in Flight Testing," Journal of Aircraft, Jun. 1988, pp. 493-498, vol. 25, No. 6.

Albert L. Braslow et al., "Simplified Method of Determination for Critical Height of Distributed Roughness Particles for Boundary-Layer Transition at Mach Nos. from 0 to 5," National Advisory Committee for Aeronautics, Technical Note 4363, pp. 1-18.

J. L. Maresh et al., "The Role of Airfoil Geometry in Minimizing the Effect of Insect Contamination of Laminar Flow Sections," AIAA 2nd Applied Aerodynamics Conference, Aug. 21-23, 1984, pp. 1-11, Seattle, Washington.

Christoph Scherfer et al., "Isolation and Characterization of Hemolymph Clotting Factors in *Drosophila melanogaster* by a Pull-out Method," Current Biology, Apr. 6, 2004, pp. 625-629, vol. 14.

U. Theopold et al., "The Coagulation of Insect Hemolymph," CMLS Cellular and Molecular Life Sciences, 2002, pp. 363-372, vol. 59.

Mitchell S. Dushay, "Insect Hemolymph Clotting," Cellular and Molecular Life Sciences, 2009, pp. 2643-2650, vol. 66.

P. D. Evans et al., "Advances in Insect Physiology," 1990, pp. 300-396, vol. 22, Harcourt Brace Jovanovich Publishers, London.

C. H. Gregoire, "Blood Coagulation in Arthropods. III. Reactions of Insect Hemolymph to Coagulation Inhibitors of Vertebrate Blood," Biological Bulletin, 1953, pp. 372-393, vol. 104.

Manickam Sugumaran et al., "Characterization of a New Phenoloxidase Inhibitor from the Cuticle of Manduca Sexta," Biochemical and Biophysical Research Communications, 2000, pp. 379-383, vol. 268.

R. D. Wagner et al., "Laminar Flow Control Leading-Edge Systems in Simulated Airline Service," Journal of Aircraft, Mar. 1990, pp. 239-244, vol. 27, No. 3.

Christopher, J. Wohl et al., "Evaluation of Commercially Available Materials to Mitigate Insect Residue Adhesion on Wing Leading Edge Surfaces," Progress Organic Coatings, 2013, pp. 42-50, vol. 76.

Albert L. Braslow et al., "A Perspective of Laminar Flow Control," AIAA Conference on Air Transportation: Technical Perspectives and Forecasts, Aug. 21-24, 1978, pp. 1-39, Los Angeles, CA.

Christopher J. Whol et al., "Copolyimide Surface Modifying Agents for Particle Adhesion Mitigation," ACS National Meeting, 2011, pp. 1-2, Denver, CO.

Christopher J. Wohl et al., "Laser Ablative Patterning of Copoly(imide siloxane)s Generating Superhydrophobic Surfaces," Langmuir, 2010, pp. 11469-11478, vol. 26, No. 13.

William L. Sellers, III et al., "The Basic Aerodynamics Research Tunnel—A Facility Dedicated to Code Validation," AIAA, 1997, pp. 22-33, vol. 88.

Dan H. Neuhart et al., "Measurements of the Flowfield Interaction Between Tandem Cylinders," 15th AIAA/CEAS Aeroacoustics Conference, May 11-13, 2009, pp. 1-18.

C. Neinhuis et al., "Characterization and Distribution of Water-repellant, Self-cleaning Plant Surfaces," Annals of Botany, 1997, pp. 667-677, vol. 79.

Omnova Solutions, Inc., "PolyFox Reactive Polymer Intermediates", Chester, SC.

Omnova Solutions, Inc., "PolyFox Structures", Chester, SC.

Yong-Kuk Yun et al., "Synthesis and Characterization of New Chiral Side Chain Liquid Crystalline Polyoxetanes," American Chemical Society, Macromolecules, 2000, 33, pp. 6653-6663.

Walter S. Coleman, "The Characteristics of Roughness from Insects as Observed for Two-Dimensional, Incompressible Flow Past Airfoils," Journal of the Aero/Space Sciences, 1959, vol. 26, pp. 264-286.

J. Lawrence et al., "Modification of the wettability characteristics of polymethyl methacrylate (PMMA) by means of $CO_2$, Nd:YAG, excimer and high power diode laser radiation," Materials and Science and Engineering, 2001, pp. 142-149, A:303.

J.S. Rossier et al., "Topography, Crystallinity and Wettability of Photoablated PET Surfaces," Langmuir, 1999, pp. 5173-5178, vol. 15.

Tommaso Baldacchini et al., "Superhydrophobic Surfaces Prepared by Microstructuring of Silicon Using a Femtosecond Laser," Langmuir, 2006, pp. 4917-4919, vol. 22.

Anne-Marier Kietzig et al., "Patterned Superhydrophobic Metallic Surfaces," Langmuir, 2009, pp. 4821-4827, 25, (8), American Chemical Society.

Miehua Jin et al., "Super-Hydrophobic PDMS Surface with Ultra-Low Adhesive Force," Macromolecular Rapid Communications, 2005, pp. 1805-1809, vol. 26, Issue 22.

H. Schulz et al., "Ultra hydrophobic wetting behaviour of amorphous carbon films," Surface and Coatings Technology, 2005, pp. 1123-1126, vol. 200.

J. Hu et al., "Improvement in the corrosion resistance of Al18B4O33w/2024Al composite by laser surface treatment," Applied Surface Science, 2006, pp. 4524-4530, vol. 253.

Q. Benard et al., "Influence of the Polymer Surface Layer on the Adhesion of Polymer Matrix Composites," Journal of Thermoplastic Composite Materials, 2009, pp. 51-61, vol. 22:51.

Wohl, Jr., Christopher J. et al., "Influences of Surface Properties and Impact Conditions on Adhesion of Insect Residues," 38th Annual Meeting, The Adhesion Society, Feb. 20-25, 2015, Savannah, Georgia.

Siochi, Emilie J., et al., "Engineered Surfaces for Mitigation of Insect Residue Adhesion," SAMPE 2013, Apr. 12, 2013, Long Beach, California.

* cited by examiner

MODIFIED SURFACE HAVING LOW ADHESION PROPERTIES TO MITIGATE INSECT RESIDUE ADHESION

CROSS-REFERENCE TO RELATED PATENT APPLICATION(S)

This patent application claims the benefit of and priority to U.S. Provisional Patent Application No. 61/657,322 filed on Jun. 8, 2012, and U.S. Provisional Patent Application No. 61/788,785, filed on Mar. 15, 2013, the contents of each of which are hereby incorporated by reference in their entirety.

STATEMENT REGARDING FEDERALLY SPONSORED RESEARCH OR DEVELOPMENT

The invention described herein was made in the performance of work under a NASA contract and by employees of the United States Government and is subject to the provisions of 51 U.S.C. §20135, and may be manufactured and used by or for the Government for governmental purposes without the payment of any royalties thereon or therefore.

BACKGROUND OF THE INVENTION

Laminar flow is the smooth, uninterrupted flow of air over a surface, such as the contour of wings, fuselage, or other parts of an aircraft in flight. Drag reduction through the maintenance of laminar flow over greater chord lengths during the cruise portion of an aircraft's flight can yield to improved fuel efficiency over long distances. However, surface imperfections, especially on the wing leading edge, can lead to transition from laminar to turbulent flow increasing drag and fuel burn.

Flight tests have shown that insect impacts on wing leading edge surfaces can leave residue with critical heights sufficient to disrupt laminar flow and decrease fuel efficiency. Since maintenance of laminar flow is most critical during cruise, insect residue adhesion mitigation is an operational necessity for fuel-efficient configurations.

Accordingly, there is a need to provide an improved method of mitigating insect residue adhesion to a surface that does not add significant weight to increase efficiency of the aircraft.

BRIEF SUMMARY OF THE INVENTION

The present invention includes a process to modify a surface to provide reduced adhesion surface properties to mitigate insect residue adhesion. The process includes providing at least one article having at least one surface, topographically modifying the surface, and chemically modifying the surface by coating said surface with a low surface energy coating. The low surface energy coating may include a polymer composition having a surface energy of less than about 50 mJ/m$^2$, or alternatively less than about 40 mJ/m$^2$. The surface may comprise a water contact angle of greater than about 80 degrees, or alternatively greater than about 110 degrees. The modified surface may also comprise a surface roughness of about 0.2 micron to about 50 microns after the surface is topographically and chemically modified. The surface may comprise a surface roughness of about 1 microns to about 10 microns. In one embodiment, the surface may be topographically modified by laser ablation with an ablation depth of about 0.5 μm to about 30 μm. The laser ablation depth may be about 1 μm to about 10 μm.

In another embodiment, the surface may be topographically and chemically modified by spray deposition of a polymer particulate composition comprising a nanocomposite material where the nanocomposite material comprises silica nanoparticles.

In yet another embodiment, the coating may include a copoly(imide fluorinated alkyl ether), fluorinated silanes, fluorinated aliphatic compounds, silicones, or fluorine-containing polymers. The coating may alternatively comprise a silane composition. The silane composition may be prepared by generating 1-2% weight aqueous ethanol solutions with glacial acetic acid to induce acid hydrolysis of the alkoxy functionality of said silane composition. Alternatively, the silane composition may comprise a mixture of Si—C$_6$, Si—C$_{12}$, and Si—C$_{18}$; or Si—F$_{17}$.

In yet another embodiment, chemical modification of the surface may also include chemical or physical vapor phase deposition, plasma deposition, submersion, spray coating, or spin casting.

These and other features, advantages, and articles of the present invention will be further understood and appreciated by those skilled in the art by reference to the following specification, claims, and appended drawings.

DETAILED DESCRIPTION OF THE INVENTION

Figure 1:
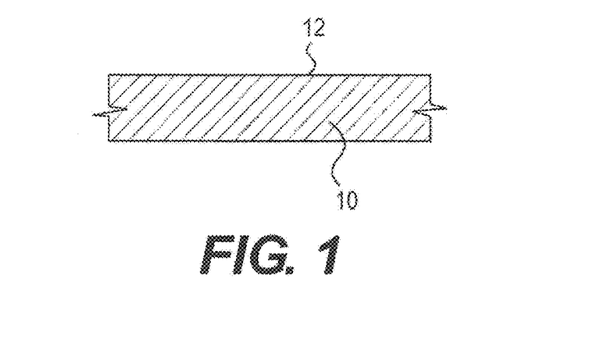
FIG. 1 is a side, cross-sectional view of a surface having a substantially smooth topography.

As shown in FIG. 1, the present invention includes providing at least one article 10 having at least one surface 12 to be chemically and topographically modified to mitigate residue adhesion to the surface 12. The present invention can be used to reduce the adhesion of insect residue on various surfaces, including but not limited to, airplane, helicopter, airborne vehicles, automobiles, marine vessels, motorcycles, helmets, wind turbines, all-terrain vehicles, floors, building, exterior walls or windows, etc. The surface may comprise any surface which will be exposed to particles or objects that may become adhered to that surface, and may comprise various types of materials including, but not limited to, metal, inorganic materials, polymeric materials, composites, textiles, and combinations of the foregoing. Examples of metallic surfaces include aluminum, titanium and related alloys thereof, and examples of inorganic surfaces include glass and ceramic articles.

As discussed herein, the surface is described as a wing surface of an aircraft, which is one embodiment of the present invention. In this embodiment, the surface is substantially smooth and the topography of this unmodified surface facilitates the laminar flow of air across and/or around it.

One aspect of the present invention is chemical modification of the surface of the article. The chemical modification can occur through application of a chemical coating to the surface of the article. The chemical coating may comprise a low surface energy coating due to their minimization of interfacial interactions. In one embodiment, the surface energy of the coating comprises less than about 50 $mJ/m^2$, or less than about 40 $mJ/m^2$. The coating can be applied by various methods including, but not limited to, spray application, dip-coating, spin-coating, film casting, physical vapor phase deposition, chemical vapor phase deposition, crystal growth, electrochemical reaction, etc. For vapor phase deposition, the procedure may involve placing the surface to be functionalized into a sealed container along with a small amount of the coating composition (e.g. silianating agent). Evaporation of the coating composition enables the functionalization of the surface.

The chemical coating can persist on the surface either due to physical adsorption or chemical reaction with the article. For physical adsorption, the coating persists on the surface due to Van der Waals forces, electrostatic and magnetic interactions, mechanical interlocking, or any combination thereof. The chemical coating may be a fluorinated silanol and a precursor thereof, an aliphatic material, fluorinated aliphatic material, silicone, fluorine-containing polymer and copolymer, an epoxy, a urethane, and mixtures of two or more of the foregoing. Alternative chemical coatings that may be effective are also disclosed in U.S. patent application Ser. No. 13/286,715, filed on Nov. 1, 2011, which is incorporated by reference herein in its entirety.

For chemical reaction with the article, the species would consist of two components, a chemical moiety that tethers the chemical to the article through chemical reaction with functionalities on the article and a chemical moiety that generates a low surface energy coating. Chemical functionalities that could be used to tether the chemical species to the article include, but are not limited to: silanes, chlorosilanes, alkoxysilanes, primary amines, secondary amines, epoxides, alcohols, carboxylic acids, esters, among others. The number of chemical reactions between the article and the surface coating chemical can be any number equal to or greater than one. Similarly, the chemical species used to modify the surface may react with itself resulting in a multilayered coating. The chemical functionalities that result in a low surface energy include, but are not limited to: aliphatic functional groups including $CH_3$, $C_2H_5$, any $CnH_{2n+1}$ or any hydrocarbon chain with unsaturation arising from double or triple carbon-carbon bonds; fluorinated aliphatic groups consisting of any number of carbon atoms with hydrogen and fluorine bonds such as $CH_2F$, $CHF_2$, $CF_3$, $C_2H_2F_3$, $C_2F_5$, any $CnF_{2n+1}$, or any combination of H and F such that the total number of H and F atoms is equal to 2n+1 with n equaling the number of carbon atoms, or any fluorinated hydrocarbon with unsaturation arising from double or triple carbon-carbon bonds.

The thickness of the chemical coating can vary from less than a molecular layer that is a surface coverage consisting of coated and uncoated regions with an average thickness of about 0.5 nm, to coatings that are about 80 microns thick. The preferential coating thickness for coatings that persist by physical adsorption would be from about 1 nm to about 80 microns, more preferential thicknesses would be from about 100 nm to about 50 microns. For chemical coatings that persist as a result of chemical reaction with the article, the preferential thickness would be from about 0.5 nm to about 1 micron with a more preferential thickness from about 0.5 nm to about 100 nm. Similarly, the coating thickness is preferred to be no greater than the separation distance between two topographical features representing the lowest frequency topographical pattern intentionally imparted on the surface. The chemical coating uniformity can be described as the continuity of the same surface chemical composition. The chemical coatings described herein can be either uniform or non-uniform. A uniform coating is described as a uniform chemical composition of a single or multiple species across the article. A non-uniform coating is described as a chemical coating of a single or multiple species that is not of uniform composition across the article. This could include regions with no coating at all with the uncoated regions ranging from about 0.01% to about 50% of the modified surface.

The present invention also includes topographical modification of the surface of the article. Chemical and topographical modification can alternatively occur in a single step or multiple steps.

For the chemical and topographical modification to occur in a single step, the coating may comprise particulate matter such that application of the coating would chemically and topographically modify the surface of the article. In one embodiment, the coating may comprise a polymer particulate composition having a nanocomposite material (e.g. silica particles).

Figure 4A:
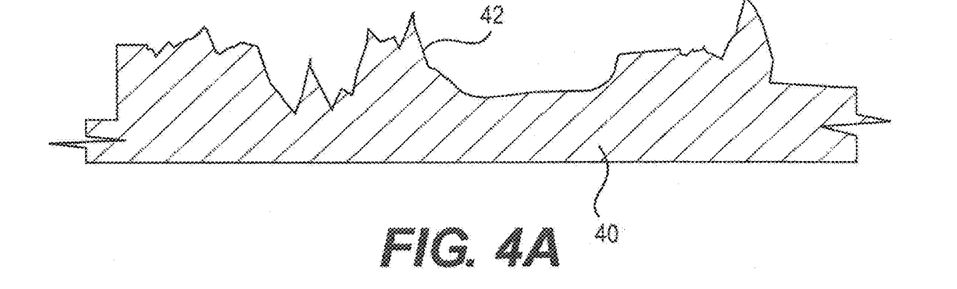
FIGS. 4A-4C are alternative cross-sectional drawings of the textured surface having a random uneven surface (FIG. 4A), a uniform symmetrically uneven surface (FIG. 4B), and a repeating uneven surface (FIG. 4C).
Figure 4B:
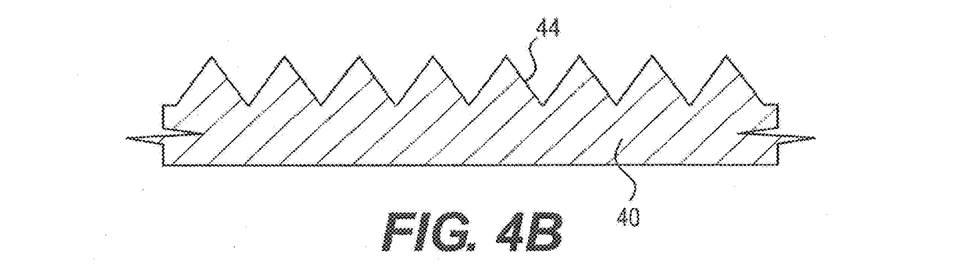
Figure 4C:
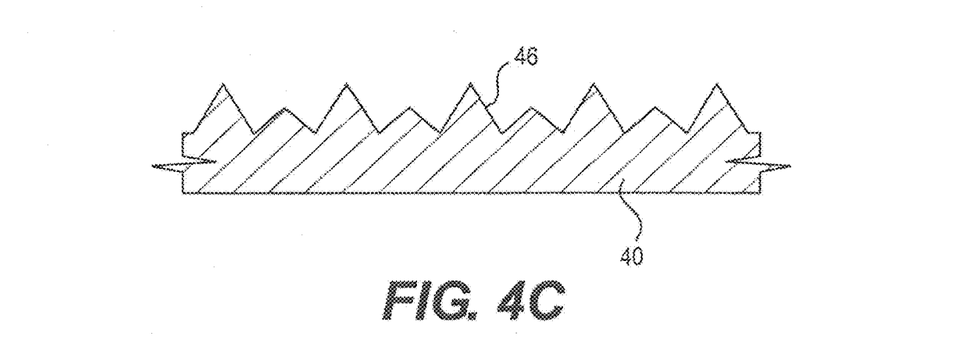

The surface can also be topographically modified separately from the chemical modification. The topography can be modified to create unevenness by either additive or subtractive methods including, but not limited to: lithographic patterning, laser ablation and chemical etching, physical vapor deposition, chemical vapor deposition, vapor phase deposition, crystal growth, electrochemical deposition, spin casting, and film casting. The unevenness may be imparted and defined in terms of a defined or random pattern of unevenness on the surface. The topography may be uniformly symmetric or asymmetric across the surface of the article. FIGS. 4A-C demonstrate examples of uneven topographies (see surfaces 42, 44 and 46 of article 40) having a random (FIG. 4A), uniform symmetric (FIG. 4B), or uniform asymmetric (FIG. 4C) types of unevenness. The topography may be described by any manner of shapes including but not limited to: spheres, triangles, any polygon, pillars, recessed cavities, overhanging structures, etc.

Figure 2:
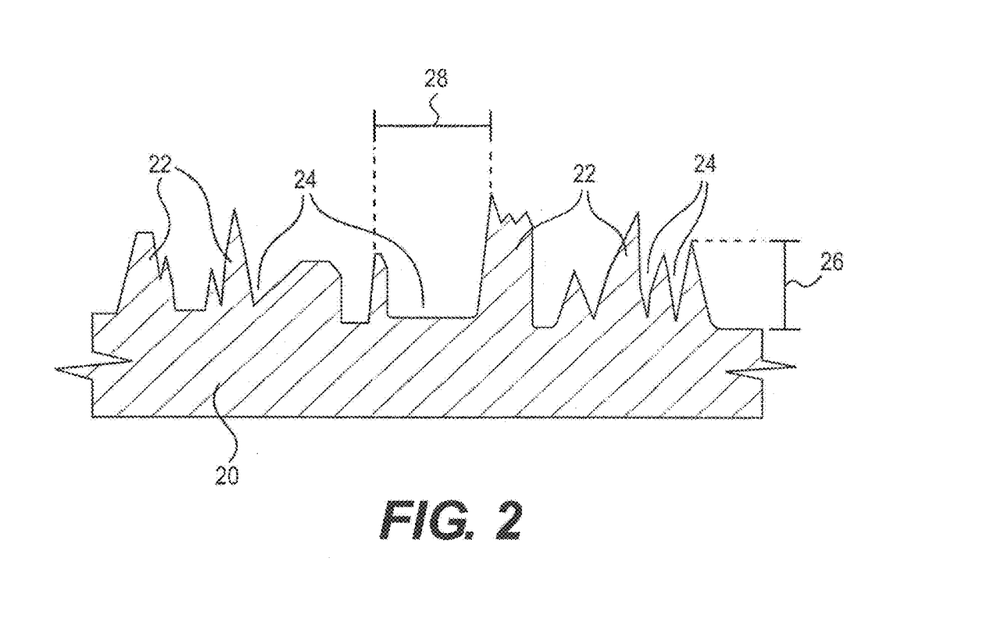
FIG. 2 is a side, cross-sectional view of a textured surface having an uneven topography.
Figure 3:
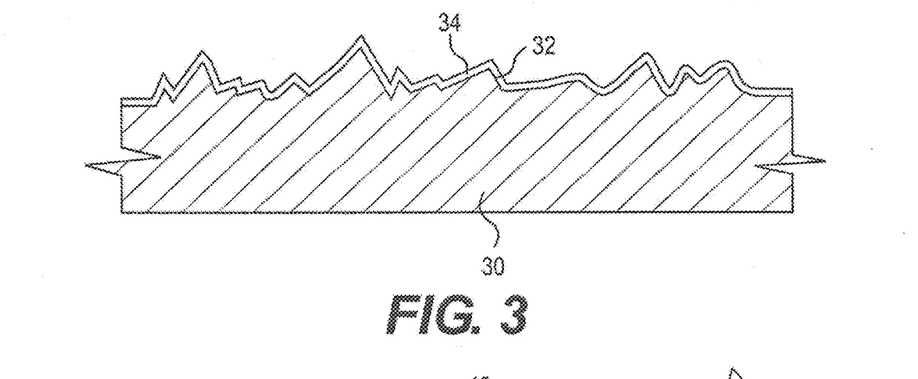
FIG. 3 is a side, cross-sectional view of a textured surface having an uneven topography and a chemical coating thereon.

Referring to FIG. 2, the pattern that is visible and that is created from the smooth surface defines peaks 22 and channels 24 in terms of the height 26 and width 28 respectively of the topographical variations. The channels are measured by width 28 as the distance between the tops of adjacent peaks 22 that are formed in the surface 20. As demonstrated in the profile view of FIG. 2, the peaks 22 and channels 24 may have the same or similar size relative to other peaks along the surface of the article. The peaks 22 may be different heights 26 (defined as the distance from the bottom of an adjacent channel to the top of a peak). The channels 24 between the peaks 22 may have the same or similar widths 28, or they may vary along the length of the channels that are formed along the surface. The peaks 22 and channels 24 may be relatively sharp in their shape, including perpendicular angles of the sides of the peaks and the floor of the channels. The shapes may also be rounded or curved or otherwise formed in the surface. Additionally, the surface topography could be comprised of any combination of rounded and sharp features.

Figure 5:
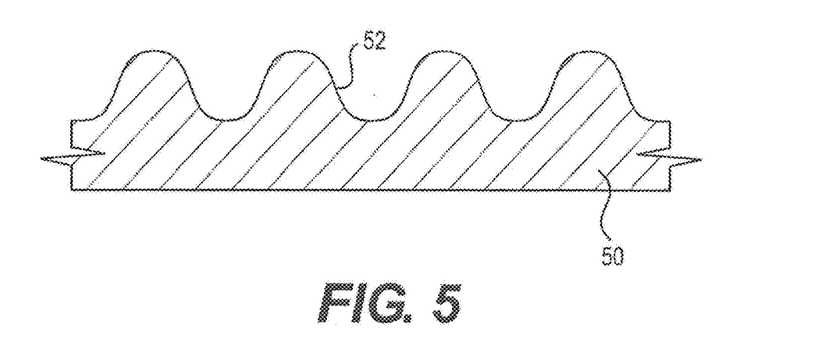
FIG. 5 is a side, cross-sectional view of a textured surface having an alternative rounded pattern of peaks and channels.
Figure 6:
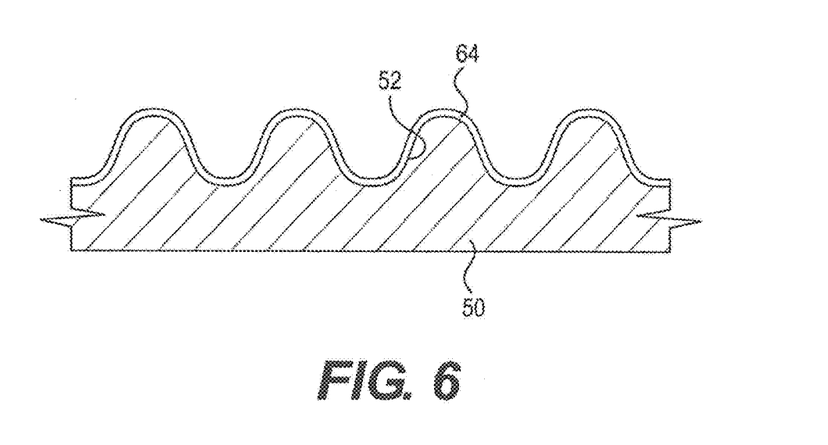
FIG. 6 is a side, cross-sectional view of a textured surface having the alternative pattern of peaks and channels as shown in FIG. 5 further modified with a chemical coating thereon.
Figure 7:
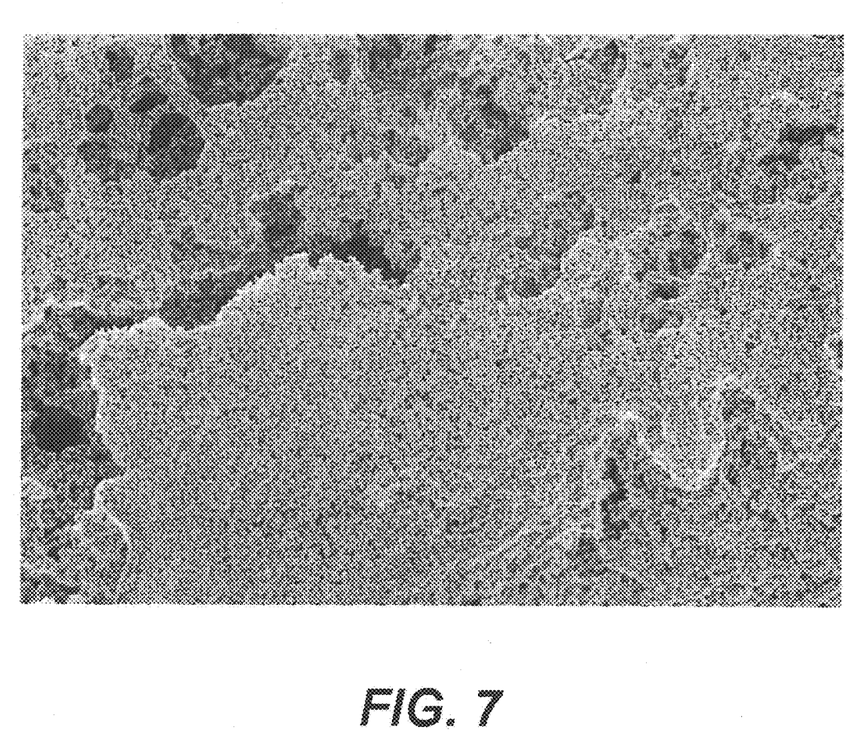
FIG. 7 is a micrograph of a surface that has been modified to create uneveness.

FIGS. 5 and 6 illustrate a surface 50 having rounded, symmetric peaks 52 that are, as shown in FIG. 6, coated with a coating 64. Also, FIG. 7 is a micrograph that shows a surface textured using laser ablation as described herein.

The size of the peaks and channels on the modified surface of the article cannot be so great as to create significant turbulence in air that moves along the surface. Accordingly, the topographical features on the surface should vary between about 10 nanometers and about 80 microns in height, alternatively between about 0.1 microns and about 20 microns in height, or still further alternatively, between about 0.5 microns and about 10 microns in height. Similarly, the size of the channels is preferably in the range of about 10 nanometers to about four millimeters or alternatively about 10 microns to about 40 microns.

Additional topographical features may be present on the surface that are an order of magnitude smaller than the features described above generating a hierarchical or fractal surface topography. For example, a surface may consist of rectangular pillars with length, width, and height dimensions of about 10 microns. These pillars could have further topographical features on them consisting of rectangular pillars that have length, width, and height dimensions of about 500 nanometers. This would be considered a hierarchical structure.

An additional parameter to describe the surface topographical modifications encompassed in this invention is the surface roughness of the material. Although there are many different ways to calculate surface roughness, for this example, the average areal surface roughness values are used. These values can be determined by any microscopy or imaging technique that provides information in three dimensions such that the average of the peaks and valleys can be determined along both length and width axes. Surface roughness is calculated as the arithmetic mean of the absolute values for the vertical deviation of surface topographical features from the mean line. For the topographies described here, the surface roughness values should vary between about 0.2 micron and about 50 microns, between about 0.5 micron and 8 microns, between about 1 micron and about 10 microns, or yet further alternatively between about 1 micron and about 6 microns.

EXAMPLE

An aluminum alloy is used and topographically modified. The topographical modification of the aluminum alloy samples was realized using two techniques: spray deposition and laser ablation patterning following by chemical modification. For the spray deposition example, a solution was generated by combining nanometer sized silica particles with a hydrophobic coating (heptadecafluoro-1,1,2,2-tetrahydrodecyltriethoxysilane) in aqueous ethanol solution. For comparison, a similar solution was made with the only variation being the use of a hydrophilic coating (methoxy(polyethyieneoxy) propyltrimethoxysilane) instead of the hydrophobic coating. For the laser ablation patterned surfaces, patterning was performed with a PhotoMachining, Inc. laser ablation system equipped with a Coherent Avia® frequency-tripled Nd:YAG laser (355 nm, average power: 7 W). The laser beam diameter and scan speed were kept constant at 25 micrometers and 25.4 cm/s. A series of different laser parameters were evaluated with pulse energies ranging from 40 to 99 microjoules per pulse. The line spacing was also varied from 12 to 102 micrometers. Other examples and teachings regarding topographical modification using a laser are disclosed in U.S. patent application Ser. No. 12/894,279, filed Sep. 30, 2010, which is incorporated by reference herein in its entirety.

In this example, a chemical modification and coating was also performed. These surfaces were then chemically modified by exposure to (heptadecafluoro-1,1,2,2-tetrahydrodecyl)triethoxysilane in a 19:1 ethanol:water solution with a minute amount of acetic acid. The solution pH was measured to be approximately five. A small volume of this solution was placed on the laser patterned surface and allowed to react for five minutes. The surface was then rinsed with copious amounts of ethanol.

The surface that is both topographically and chemically modified as described was measured and assessed by using water contact angle goniometry. The surfaces were characterized using water contact angle goniometry with a First Ten Angstroms FTA 1000B contact angle goniometer. Several of the modified surfaces exhibited water contact angles in excess of 170 degrees. These surfaces were tested for insect adhesion under dynamic conditions using a custom-built pneumatic insect delivery device that delivered fruit flies to the surface at an average speed of 138 mph with a standard deviation of 27 mph. High-speed photography was obtained during impact events using a Vision Research Phantom 12 camera at a speed of 50,000 frames per second. Digital images of the post-insect impacted samples were obtained using an Olympus C-740 UltraZoom Digital Camera.

TABLE 1

Surface characterization and fruit fly impact results of laser ablation patterned Al alloy surfaces and coated surfaces.

| Coating | Pulse Energy, µJ/pulse | Line Spacing, µm | Water Contact Angle, ° Ablated | Water Contact Angle, ° Silanated | Roughness, $R_a$, µm | Maximum Height, µm | Areal Coverage, mm$^2$ |
|---|---|---|---|---|---|---|---|
| Control | — | — | 84$^a$ | — | 0.31 | 69 | 1.27 |
| Control & F17 | — | — | — | 110 | — | 66 | 0.71 |
| LA-1 | 40 | 50.8 | 26 | 170 | 1.854 | 60 | 0.26 |
| LA-2 | 40 | 25.4 | 82 | 162 | 2.227 | 66.1 | 1.33 |
| LA-3 | 40 | 12.7 | 5$^b$ | 165 | 0.595 | 62 | 0.45 |
| LA-4 | 65 | 101.6 | 5 | 162 | 2.549 | 89.7 | 0.31 |
| LA-5 | 65 | 50.8 | 5 | 166 | 3.402 | 97 | 1.43 |
| LA-6 | 65 | 25.4 | 5 | 167 | 4.166 | 100.7 | 0.77 |
| LA-7 | 65 | 12.7 | 5 | 165 | 1.197 | 71.5 | 0.45 |

TABLE 1-continued

Surface characterization and fruit fly impact results of laser ablation patterned Al alloy surfaces and coated surfaces.

| Coating | Pulse Energy, μJ/pulse | Line Spacing, μm | Water Contact Angle, ° Ablated | Water Contact Angle, ° Silanated | Roughness, $R_a$, μm | Profilometry Results Maximum Height, μm | Areal Coverage, mm² |
|---|---|---|---|---|---|---|---|
| LA-8 | 99 | 101.6 | 5 | 166 | 2.154 | 66.4 | 0.40 |
| LA-9 | 99 | 50.8 | 5 | 167 | 5.328 | 63.9 | 0.50 |
| LA-10 | 99 | 25.4 | 5 | 171 | 5.11 | 66.6 | 1.31 |
| LA-11 | 99 | 12.7 | 5 | 164 | 3.459 | 66.9 | 0.28 |

[a]Control surfaces were not laser ablation patterned.
[b]Contact angles reported as 5° were not able to be accurately measured due to rapid wetting of the surface where contact angles on these surfaces approached 0°.

The "Areal Coverage" column in Table 1 was determined using the optical surface profilometer. The areal coverage represents the surface area that has insect residue remaining on it after the test described herein and the insect impact samples discussed. Both the area and the height of the insect residue may be relevant for the purpose of any subsequent aerodynamic testing.

The results above are for exemplary purposes only, and one of ordinary skill in the art would adjust the various parameters depending on the desired reduction in adhesion properties, which would vary depending on the type of surface, conditions under which adhesion should be mitigated, coating types and methods of topographical modification.

While some embodiments of the invention have been herein illustrated, shown and described, it is to be appreciated that various changes, rearrangements and modifications may be made therein, without departing from the scope of the invention as defined by the appended claims. It is intended that the specific embodiments and configurations are disclosed for practicing the invention, and should not be interpreted as limitations on the scope of the invention as defined by the appended claims and it is to be appreciated that various changes, rearrangements and modifications may be made therein, without departing from the scope of the invention as defined by the appended claims.

What is claimed is:

1. A process of mitigating insect residue adhesion on an aerodynamic surface to maintain laminar flow, the process comprising:
    a. providing at least one article having at least one aerodynamic surface that is impacted by insects in use;
    b. topographically modifying said aerodynamic surface;
    c. chemically modifying said aerodynamic surface by coating said aerodynamic surface with a low surface energy coating;
    wherein the modified aerodynamic surface comprises a water contact angle of greater than about 80 degrees and a surface roughness of about 0.2 micron to about 50 microns after said aerodynamic surface is topographically and chemically modified, wherein the modified aerodynamic surface is configured to maintain laminar flow of air that moves across the modified aerodynamic surface and mitigate adhesion of insect residue without creating significant turbulence in air that moves along the modified aerodynamic surface in use.

2. The process of claim 1, wherein said modified aerodynamic surface comprises a surface roughness of about 1 micron to about 10 microns.

3. The process of claim 1, wherein said modified aerodynamic surface is topographically modified by laser ablation with an ablation depth of about 1 μm to about 30 μm.

4. The process of claim 1, wherein said aerodynamic surface is topographically modified by laser ablation with an ablation depth of about 1 μm to about 10 μm.

5. The process of claim 1, wherein said modified aerodynamic surface is topographically and chemically modified by spray deposition of a polymer particulate composition comprising a nanocomposite material.

6. The process of claim 5, wherein said nanocomposite material comprises silica nanoparticles.

7. The process of claim 1, wherein said coating comprises a polymer composition having a surface energy of less than about 50 mJ/m².

8. The process of claim 1, wherein said coating comprises a polymer composition having a surface energy of less than about 40 mJ/m².

9. The process of claim 1, wherein said coating is chosen from the group consisting of: copoly(imide fluorinated alkyl ether), fluorinated silanes, fluorinated aliphatic compounds, silicones, and fluorine-containing polymers.

10. The process of claim 1, wherein said coating comprises copoly(imide fluorinated alkyl ether).

11. The process of claim 1, wherein said coating comprises a silane composition.

12. The process of claim 11, wherein said silane composition is prepared by generating aqueous ethanol solutions with glacial acetic acid to induce acid hydrolysis of the alkoxy functionality of said silane composition.

13. The process of claim 11, wherein said silane composition comprises a mixture of $Si-C_6$, $Si-C_{12}$, and $Si-C_{18}$.

14. The process of claim 11, wherein said silane composition comprises $Si-F_{17}$.

15. The process of claim 1, wherein said water contact angle is greater than about 110 degrees.

16. The process of claim 1, wherein said coating is applied by a method chosen from the group consisting of: vapor phase deposition, plasma deposition, spin casting, submersion, and spray coating.

17. A process of mitigating insect residue adhesion on an aerodynamic surface to maintain laminar flow, the process comprising:
    a. providing at least one article having at least one aerodynamic surface that is impacted by insects in use;
    b. topographically modifying said aerodynamic surface;
    c. chemically modifying said aerodynamic surface by coating said aerodynamic surface with a coating having a surface energy of less than about 50 mJ/m²;

wherein the modified aerodynamic surface comprises a water contact angle of greater than about 80 degrees and a surface roughness of about 1 micron to about 10 microns after said aerodynamic surface is topographically and chemically modified, wherein the modified aerodynamic surface is configured to maintain laminar flow of air that moves across the aerodynamic surface and mitigate adhesion of insect residue without creating significant turbulence in air that moves along the modified aerodynamic surface in use.

18. The process of claim 17, wherein said coating comprises a surface energy of less than about 40 mJ/m$^2$.

19. The process of claim 18, wherein said modified aerodynamic surface is topographically and chemically modified by a coating comprising a polymer particulate composite having a nanocomposite material.

* * * * *